United States Patent
Hong et al.

(10) Patent No.: US 12,493,749 B2
(45) Date of Patent: Dec. 9, 2025

(54) METHOD FOR PROVIDING SERVICE BASED ON INTEGRATED CHATBOT AND SYSTEM THEREOF

(71) Applicant: SAMSUNG SDS CO., LTD., Seoul (KR)

(72) Inventors: Ju Seon Hong, Seoul (KR); Jae Hyuck Jang, Seoul (KR); Seong Su Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 241 days.

(21) Appl. No.: 18/219,457

(22) Filed: Jul. 7, 2023

(65) Prior Publication Data

US 2025/0013674 A1 Jan. 9, 2025

(30) Foreign Application Priority Data

Jul. 11, 2022 (KR) ........................ 10-2022-0084758

(51) Int. Cl.
*G06F 40/35* (2020.01)
*G06F 16/332* (2019.01)
*G06F 16/3329* (2025.01)
*G06F 16/3332* (2025.01)

(52) U.S. Cl.
CPC .......... *G06F 40/35* (2020.01); *G06F 16/3325* (2019.01); *G06F 16/3329* (2019.01); *G06F 16/3334* (2019.01)

(58) Field of Classification Search
None
See application file for complete search history.

(56) References Cited

U.S. PATENT DOCUMENTS

| | | | | |
|---|---|---|---|---|
| 8,589,429 | B1 * | 11/2013 | Thirumalai | G06F 16/2228 707/766 |
| 10,102,545 | B2 * | 10/2018 | Lee | G06Q 30/0275 |
| 10,706,098 | B1 * | 7/2020 | Ramesh | G06Q 30/0641 |
| 2006/0074997 | A1 * | 4/2006 | Chiu | G06F 40/274 |
| 2007/0288431 | A1 * | 12/2007 | Reitter | G06F 16/951 |

(Continued)

FOREIGN PATENT DOCUMENTS

| | | |
|---|---|---|
| JP | 2021-149633 A | 9/2021 |
| KR | 10-2107303 B1 | 5/2020 |

(Continued)

OTHER PUBLICATIONS

Gerald Salton et al., "Introduction to Modern Information Retrieval", McGraw-Hill, 1983, 15 pages.

(Continued)

*Primary Examiner* — Douglas Godbold
(74) *Attorney, Agent, or Firm* — Sughrue Mion, PLLC

(57) ABSTRACT

Provided is a method performed by a computing system for providing an integrated chatbot-based service. The method includes receiving, by an integrated chatbot, a query from a user device; extracting a main keyword from the query; transmitting the extracted main keyword to a first chatbot and a second chatbot; receiving, from the first chatbot and the second chatbot, a content search result corresponding to the extracted main keyword; and providing a response to the query to the user device based on the received content search result.

16 Claims, 13 Drawing Sheets

(56) References Cited

U.S. PATENT DOCUMENTS

| | | | |
|---|---|---|---|
| 2013/0046584 A1* | 2/2013 | Yu | G06F 16/951 |
| | | | 707/723 |
| 2016/0217142 A1* | 7/2016 | Ye | G06F 16/3344 |
| 2018/0025726 A1* | 1/2018 | Gatti de Bayser | G10L 15/22 |
| | | | 704/257 |
| 2020/0104415 A1* | 4/2020 | Satti | G06F 16/3325 |
| 2020/0372055 A1* | 11/2020 | Joko | G06F 40/268 |
| 2021/0081615 A1* | 3/2021 | McRitchie | H04L 51/02 |
| 2021/0144107 A1* | 5/2021 | Liang | G06N 5/04 |
| 2021/0304253 A1* | 9/2021 | Kumbi | G06Q 30/0263 |
| 2021/0397416 A1* | 12/2021 | Rajesh | G06F 8/31 |
| 2022/0272054 A1* | 8/2022 | Gao | G06F 40/284 |
| 2022/0335050 A1* | 10/2022 | Koussa | G06F 16/3323 |
| 2022/0343257 A1* | 10/2022 | Mohanty | G06F 40/30 |
| 2022/0351058 A1* | 11/2022 | Yannam | G06N 5/043 |
| 2022/0358922 A1* | 11/2022 | Srivastava | G06F 3/167 |
| 2023/0412530 A1* | 12/2023 | Schuetz | G06N 3/045 |

FOREIGN PATENT DOCUMENTS

| | | |
|---|---|---|
| KR | 10-2119404 B1 | 6/2020 |
| KR | 10-2146031 B1 | 8/2020 |
| KR | 10-2021-0061126 A | 5/2021 |
| KR | 10-2271361 B1 | 6/2021 |
| KR | 10-2278020 B1 | 7/2021 |
| KR | 10-2324215 B1 | 11/2021 |
| KR | 10-2357620 B1 | 2/2022 |

OTHER PUBLICATIONS

Christopher D. Manning et al., "An Introduction to Information Retrieval", Cambridge University Press, Apr. 2009, 581 pages.
Gerald Salton et al., "Term-weighting approaches in automatic text retrieval", Information Processing & Management, vol. 24, Issue 5,1988, pp. 513-523.

\* cited by examiner

| Title | HashTag | Keyword(redundancy removal) |
|---|---|---|
| What are the language standards? | English_certification_test, English, conversation, standard, condition, level, reflect, company, grade_score, foreign, qualification, point_extra point | language, standard, what, certification, test, English, conversation, condition, level, reflect, company, grade, score, foreign, qualification, point, extra point |
| Where can I apply for the English language certification test? | English_certification_test, English, conversation, language, test, test schedule, assessment | certification, apply, where, English, conversation, language, test, schedule, assessment |

| Keyword | TF | DF |
|---|---|---|
| leave of absence | 227 | 210 |
| language | 32 | 30 |
| test | 30 | 19 |
| apply | 498 | 480 |
| possible | 359 | 350 |

FIG. 7

| bot_name | content_id | content_name | read_count |
|---|---|---|---|
| company life guide | A-03-01-05 | retirement procedure | 1202 |
| company life guide | A-03-01-04 | leave procedure | 730 |
| company life guide | E-02-02-04 | process guide for business trips to the same country for more than 183 days | 255 |
| management bot | E-02-01-08 | structural cost reduction performance process | 125 |
| management bot | E-02-01-06 | promotion product creation process | 87 |
| purchase guide bot | A-04-03 | [Outsourcing] What is the process after requesting a contract? | 67 |
| information strategy survey | M-01-02-06 | [Logistics] What is the logistics contract conclusion process? | 63 |
| information strategy survey | N-01-04 | [Logistics] What is the conclusion process when contract issues arise? | 59 |
| compliance bot | B-02-03 | [Consignment transaction] Can you tell me about the consignment transaction process | 42 |
| purchase guide bot | A-05-07 | [Outsourcing] payment process after inspection of outsourcing work | 40 |

FIG. 8

| |
|---|
| Here are the search results for 'process' |
| 1. retirement procedure |
| 2. leave procedure |
| 3. process guide for business trips to the same country for more than 183 days |
| 4. structural cost reduction performance process |
| 5. promotion product creation process |
| 6. [Outsourcing] What is the process after requesting a contract? |
| 7. [Logistics] What is the logistics contract conclusion process? |
| 8. [Logistics] What is the conclusion process when contract issues arise? |
| 9. [Consignment transaction] Can you tell me about the consignment transaction process? |
| 10. [Outsourcing] Payment process after inspection of outsourcing work |

FIG. 9

METHOD FOR PROVIDING SERVICE BASED ON INTEGRATED CHATBOT AND SYSTEM THEREOF

This application claims priority from Korean Patent Application No. 10-2022-0084758, filed on Jul. 11, 2022, in the Korean Intellectual Property Office, the disclosure of which is incorporated herein by reference in its entirety.

BACKGROUND

1. Field

The present disclosure relates to an integrated chatbot-based service providing method and system therefor. More specifically, it relates to a method and system for providing services provided by a plurality of chatbot groups as an integrated service.

2. Description of the Related Art

A chatbot is a compound word of chat and robot, and refers to software designed to carry out a conversation with a human through text or voice and to perform a specific task through the conversation. The chatbot is called various names such as chatterbot, talkbot, intelligent agent, and interactive agent.

In the conventional chatbot service, if the number of chatbots according to the purpose of the service is too large, there is problems in that a user has to directly search for a chatbot according to his/her purpose and ask a question, and if a chatbot that does not meet his/her purpose is selected, the user does not get the desired answer and wastes time.

If a user gets a result that does not meet the purpose, the reliability of the chatbot decreases, and the user who has experienced such an experience no longer seeks the chatbot. Therefore, there is a need for a chatbot service that can more accurately and efficiently display desired results by integrating chatbot groups into one.

SUMMARY

The technical problem to be solved by the present disclosure is to provide a method and system for providing an integrated chatbot service by integrating a plurality of chatbot groups into one.

Another technical problem to be solved by the present disclosure is to provide a method and system for accurately searching for and providing content matching a user's intention.

Another technical problem to be solved by the present disclosure is to provide a method and system for recommending an additional search term so that content matching a user's intention can be searched.

The technical problems of the present disclosure are not limited to the above-mentioned technical problems, and other technical problems not mentioned will be clearly understood by those skilled in the art from the description below.

According to an aspect of the inventive concept, there is provided a method performed by a computing system for providing an integrated chatbot-based service. The method may include: receiving, by an integrated chatbot, a query from a user device; extracting a main keyword from the query; transmitting the extracted main keyword to a first chatbot and a second chatbot; receiving, from the first chatbot and the second chatbot, a content search result corresponding to the extracted main keyword; and providing a response to the query to the user device based on the received content search result.

In some embodiments, the extracting the main keyword may include extracting a keyword from the query and extracting the main keyword by removing a keyword that does not match a content keyword of the first chatbot and the second chatbot from among the extracted keyword.

In some embodiments, the content keyword may be extracted from content of the first chatbot and the second chatbot based on an occurrence frequency of a keyword.

In some embodiments, the method may further include providing a fall-back message to a user device immediately in response to determining that the main keyword does not exist as a result of the removal.

In some embodiments, the providing the response may include providing the content search result to the user device when a number of contents included in the content search result is within a predetermined range.

In some embodiments, the providing the response may include recommending a search term related to the main keyword when a number of contents included in the content search result exceeds a reference value.

In some embodiments, the recommending the search term may include calculating a relevancy score based on a co-occurrence frequency of each content keyword of content keywords appearing in content included in the content search result and the main keyword and selecting a content keyword whose relevancy score is equal to or greater than a reference value from among the content keywords and configuring a search term recommendation list based on the selected content keyword.

In some embodiments, the configuring the search term recommendation list may include configuring the search term recommendation list by arranging the selected content keyword in order of the higher relevancy score.

In some embodiments, the relevancy score may be calculated based on the co-occurrence frequency and an occurrence frequency of a content keyword.

In some embodiments, the providing the response may include recommending, when content does not exist in the content search result and a number of the extracted main keyword is plural, removal of some of the extracted main keywords.

In some embodiments, the recommending removal of some of the extracted main keywords may include providing a removal recommendation list of some keywords by removing one keyword from among the extracted main keywords in order of lower weight and recommending content re-search using remaining main keywords except for the one removed keyword.

In some embodiments, the providing the removal recommendation list of some keywords may further include providing, if content is not searched as a result of the content re-search, a removal recommendation list of some keywords by removing two keywords from among the extracted main keywords in order of lower weight and recommending content re-search using remaining main keywords except for the two removed keywords.

In some embodiments, the weight may be a value derived using a TF-IDF (Term Frequency-Inverse Document Frequency) algorithm and the Document may correspond to content.

In some embodiments, the providing the response may include sorting the content search result according to a predetermined priority to provide it to the user device.

In some embodiments, the predetermined priority may be based on at least one of a relevancy with a currently ongoing event and a number of views of the searched content.

According to another aspect of inventive concept, there is provided a system for providing an integrated chatbot-based service. The system may include a memory configured to store one or more instructions; and one or more processors configured to execute the stored one or more instructions to perform: receiving a query from a user device; extracting a main keyword from the query; transmitting the extracted main keyword to a first chatbot and a second chatbot; receiving, from the first chatbot and the second chatbot, a content search result corresponding to the extracted main keyword; and providing a response to the user device based on the received content search result.

According to still another aspect of inventive concept, there is provided a non-transitory computer readable recording medium storing computer program executable by at least one processor to perform: receiving, by an integrated chatbot, a query from a user device; extracting a main keyword from the query; transmitting the extracted main keyword to a first chatbot and a second chatbot; receiving, from the first chatbot and the second chatbot, a content search result for the extracted main keyword; and providing a response to the query to the user device based on the received content search result.

BRIEF DESCRIPTION OF THE DRAWINGS

These and/or other aspects will become apparent and more readily appreciated from the following description of the embodiments, taken in conjunction with the accompanying drawings in which:

FIG. 7 is an exemplary diagram for describing a method for extracting keywords and calculating keyword weights according to some embodiments of the present disclosure;

FIGS. 8 and 9 are exemplary diagrams for describing a content search result sorting method according to some embodiments of the present disclosure;

DETAILED DESCRIPTION

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

Hereinafter, embodiments of the present disclosure will be described with reference to the attached drawings.

Figure 1:
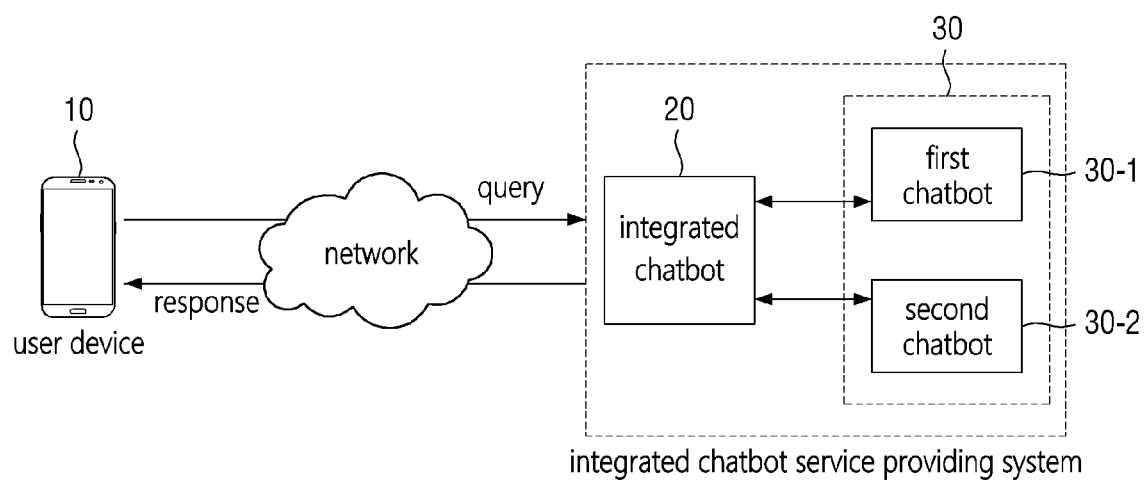
FIG. 1 is an exemplary configuration diagram illustrating an integrated chatbot service providing system and a network environment according to an embodiment of the present disclosure.

FIG. 1 is an exemplary configuration diagram illustrating an integrated chatbot-based service providing system and a network environment according to an embodiment of the present disclosure.

Referring to FIG. 1, the integrated chatbot service providing system may include an integrated chatbot 20 and a chatbot group 30. Here, the chatbot group 30 may include a first chatbot 30-1 and a second chatbot 30-2. Hereinafter, in the present disclosure, the chatbot group 30 is meant to include both the first chatbot 30-1 and the second chatbot 30-2. However, this is only an example embodiment for achieving the object of the present disclosure, and some components may be added or deleted as needed. For example, the number of chatbots included in the chatbot group 30 may further increase. The integrated chatbot 20 may mean an integrated chatbot server 20 that provides a chatbot service using an integrated chatbot, and the chatbot group 30 may mean the chatbot group server 30 that provides a chatbot service using a chatbot group associated with the integrated chatbot.

In addition, it should be noted that each component of the integrated chatbot service providing system shown in FIG. 1 represents functionally distinct functional elements, and a plurality of components may be implemented in a form integrated with each other in a real physical environment. For example, at least some of the one or more chatbots 30-1 and 30-2 and the integrated chatbot 20 may be implemented in the form of different logics within one physical computing device.

Also, in a real physical environment, each of the components may be implemented in a form of being separated into a plurality of detailed functional elements. For example, a first function of the first chatbot (e.g., 30-1) may be implemented in a first computing device, and a second function may be implemented in a second computing device. In the same context, a plurality of functions of the integrated chatbot 20 may also be implemented in a plurality of computing devices.

Hereinafter, each component of the integrated chatbot service providing system will be described.

In the integrated chatbot service providing system, the integrated chatbot 20 is a program (or computing system) that provides a chatbot service. For example, the integrated chatbot 20 may receive a query from the user device 10 and provide a response to the query using the chatbot group 30. The service of the integrated chatbot is preferably provided through a messenger platform to maximize user accessibility, but the technical scope of the present disclosure is not limited thereto.

The program (or computing system) may be, but is not limited to, a laptop computer, a desktop computer, and the like, and may include all types of devices having a computing function and a communication function. Some examples of the computing device can be referred to FIG. 13.

In the chatbot group 30 server, pre-stored chatbot contents of different categories may be stored. For example, the first chatbot 30-1 may provide a chatbot service for chatbot contents using pre-stored purchase guide content, and the second chatbot 30-2 may provide a chatbot service for chatbot contents using pre-stored business management content. In this case, the chatbot content of pre-stored purchase guide content and business management content may be stored in the server of the chatbot group 30.

The chatbot group 30 may search for content according to a request from the integrated chatbot 20 and transmit the search result to the integrated chatbot 20. A description of how the integrated chatbot 20 provides the integrated chatbot service will be described later with reference to the drawings below FIG. 2.

The user device 10 is a device of a user using an integrated chatbot service. For example, the user may use the integrated chatbot service in the form of transmitting a query through the device 10 and receiving a response thereto. At this time, the interface between the user device 10 and the integrated chatbot 20 may be implemented in various forms such as messenger-based and web-based. The user device 10 may be implemented as any device.

As shown in FIG. 1, the user device 10 and the integrated chatbot service providing system may communicate through a network. In some embodiments, the integrated chatbot 20 and chatbot group 30 may also communicate over a network. Here, the network can be implemented as all types of wired/wireless networks such as a local area network (LAN), a wide area network (WAN), a mobile radio communication network, and Wibro (Wireless Broadband Internet).

So far, the integrated chatbot service providing system and network environment according to an embodiment of the present disclosure have been described with reference to FIG. 1. Hereinafter, a method for providing an integrated chatbot service according to various embodiments of the present disclosure will be described in detail. In order to provide convenience of understanding, the description of the method will be continued on the assumption of the environment shown in FIG. 1, but those skilled in the art can clearly understand that the environment, in which the chatbot service is provided, can be modified.

Each step of the methods to be described below may be performed by a computing device. In other words, each step of the above methods may be implemented as one or more instructions executed by a processor of a computing device. All of the steps involved in the methods could be executed by one physical computing device, but the first steps of the method may be performed by a first computing device and the second steps of the method may be performed by a second computing device. Hereinafter, unless otherwise stated, description will continue on the assumption that each step of the method is performed by the integrated chatbot 20 or the integrated chatbot server. However, for convenience of description, the description of the operating subject of each step included in the method may be omitted. In addition, in the methods to be described later, the execution order of each operation can be changed within the range where the execution order can be logically changed as needed.

Figure 2:
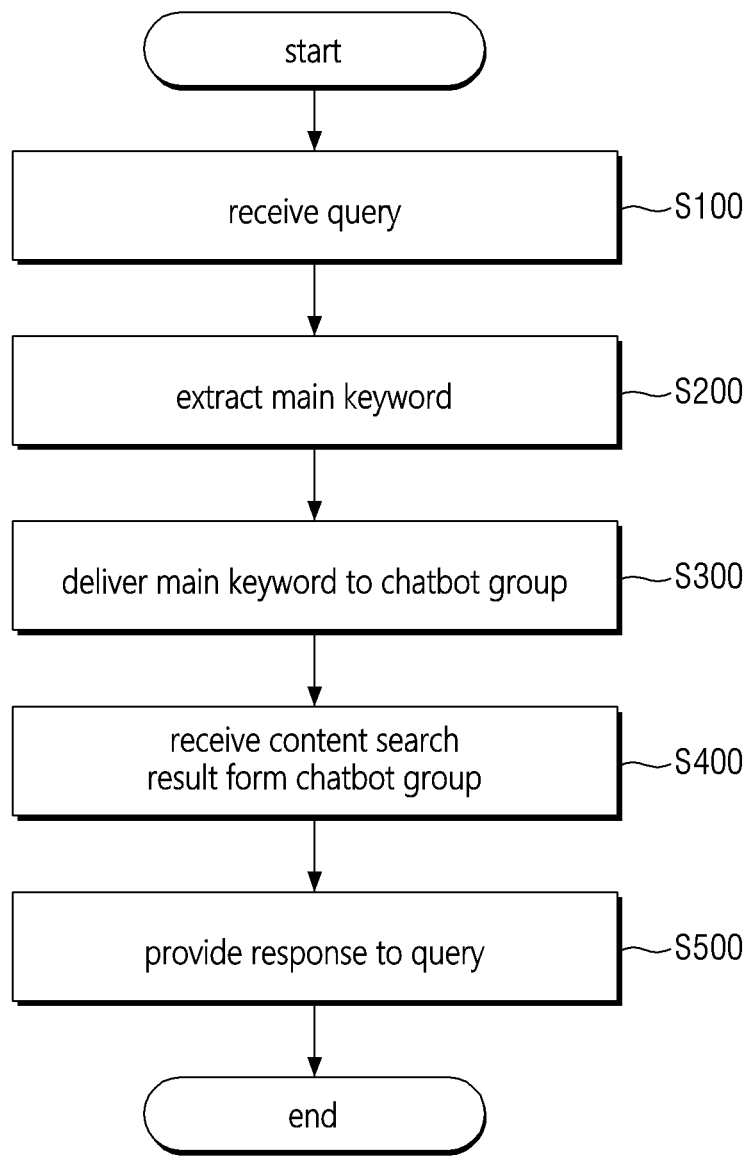
FIG. 2 is a flowchart illustrating a method for providing an integrated chatbot service according to another embodiment of the present disclosure.

FIG. 2 is a flowchart illustrating a method for providing an integrated chatbot service according to an embodiment of the present disclosure.

Referring to FIG. 2, in step S100, a query may be received from the user device 10.

In step S200, main keywords may be extracted from the query received from the user device 10. Hereinafter, a method of extracting a main keyword (S200) will be described with reference to FIG. 3.

Figure 3:
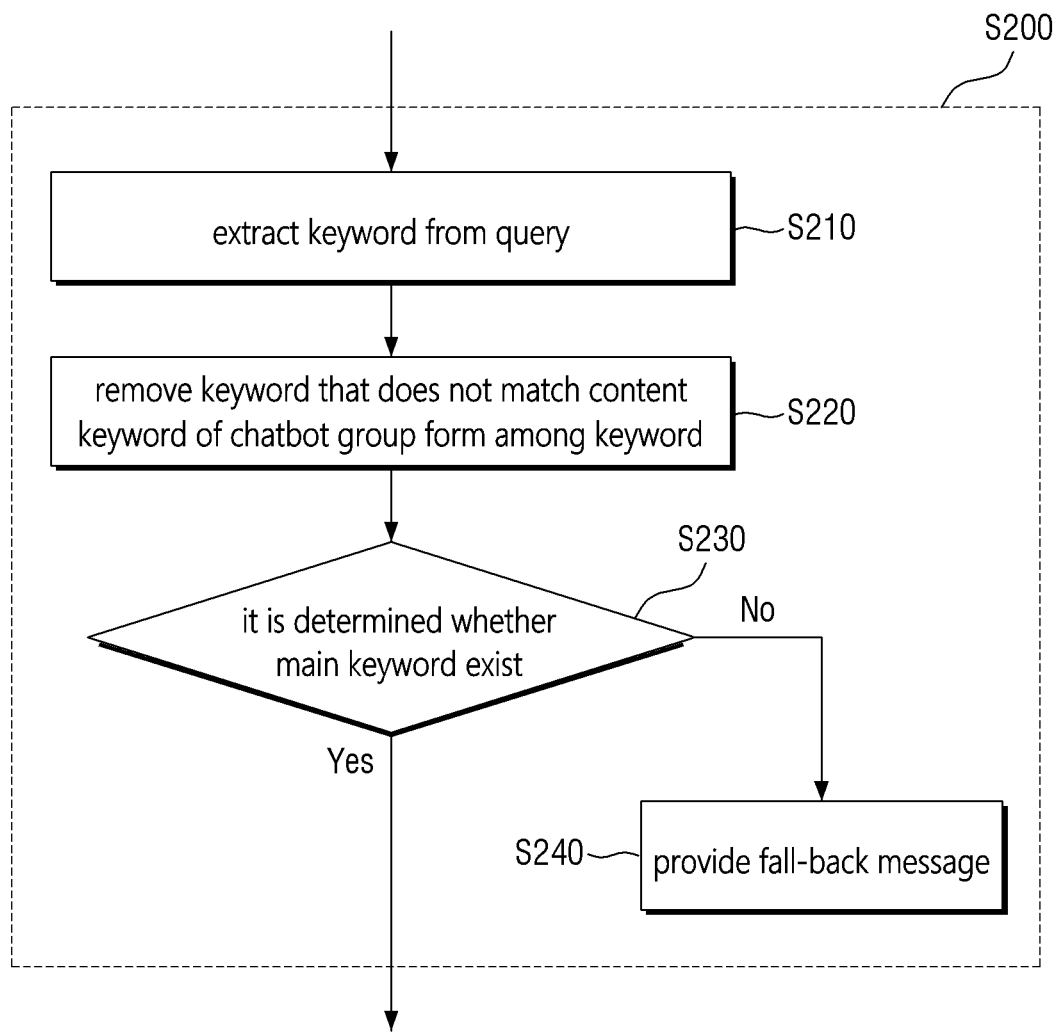
FIG. 3 is a detailed flowchart for describing the main keyword extraction method described with reference to FIG. 2.

Referring to FIG. 3, in step S210, keywords may be extracted from a query.

According to an embodiment, morphemes may be analyzed in a query to extract nouns, verbs, or adjectives. In this case, the keyword may mean the extracted noun, verb, or adjective.

According to an embodiment, words remaining after morphemes are analyzed in a query and postpositions are automatically removed are extracted, and the extracted words may mean keywords.

According to an embodiment, various morpheme analysis algorithms such as the KOMORAN algorithm may be used as the morpheme analysis method, and any algorithm may be used.

In step S220, main keywords may be extracted by removing keywords that do not match the content keywords of the chatbot group 30 from among the extracted keywords.

Here, the content keyword may mean a keyword extracted from contents included in the chatbot group 30. For example, the first content keyword and the second content keyword may be extracted by using the TF algorithm in the first chatbot 30-1 and the second chatbot 30-2. In this case, the content keyword may be a keyword including the first content keyword and the second content keyword. According to an embodiment, the content keyword may be extracted from the content of the chatbot group 30 based on the occurrence frequency of the keyword. Here, as a method of extracting keywords using the keyword occurrence frequency, various keyword occurrence frequency analysis algorithms such as TF (Term Frequency) algorithm may be utilized, and any algorithm may be used. A specific example of extracting keywords using the TF algorithm will be described later with reference to FIG. 7.

According to one embodiment, content keywords may be extracted in advance, organized in the form of a table, and stored in the integrated chatbot 20 server. In addition, each content keyword may be indexed with the content of the chatbot group 30 server. For example, each content keyword stored in the integrated chatbot 20 server may be indexed with the content of the first chatbot 30-1 server and the content of the second chatbot 30-2 server.

According to one embodiment, keywords that do not match the chatbot group content keywords may be removed from among the keywords extracted from the query. And, the remaining keywords (i.e., keywords of the query that match the content keywords) that are not removed may be extracted as the main keywords.

In step S230, it is determined whether the main keyword exists.

According to an embodiment, as a result of removing keywords that do not match content keywords in step S220, when the main keyword does not exist, a fall-back message may be provided to the user device 10 immediately (S240). Here, the fall-back message may be, for example, a response that there is no prepared answer (e.g., a response message that content related to the user's query does not exist).

Referring back to FIG. 2, in step S300, the main keyword may be delivered to the chatbot group 30 in response to determining that the main keyword exists. Here, when the main keyword is delivered, content search may be requested to the chatbot group 30 based on the main keyword.

According to one embodiment, when content search is requested to the chatbot group 30, the request may be made to the chatbot group 30 simultaneously in an asynchronous manner. For example, a content search request may be simultaneously called to the first chatbot 30-1 and the second chatbot 30-2.

According to the above-described embodiment, in the content search request call for a chatbot group, a request is sent to each chatbot and a response can be received regardless of the order of the request by using an asynchronous call instead of a synchronous call. Therefore, an effect of providing a content search result to the user more quickly is provided since the time taken to receive a response is shortened.

In step S400, content search results may be received from the chatbot group 30, and the received content search results may be collected.

According to one embodiment, when content search is requested along with the delivery of the main keyword to the chatbot group 30 in the asynchronous manner, the content stored in the first chatbot server 30-1 may be searched based on the main keyword by the first chatbot 30-1 to obtain a first content search result, and the content stored in the second chatbot 30-2 server may be searched based on the main keyword by the second chatbot 30-2 to obtain a second content search result. Then, the first content search result and the second content search result are delivered to the integrated chatbot 30 in an asynchronous manner, and after the last content search result is delivered, the content search result may be collected.

According to an embodiment, when there are a plurality of main keywords, the chatbot group 30 may combine the plurality of main keywords with an AND condition to perform content search.

In step S500, a response to the query may be provided to the user device 10 based on the collected content search results.

Hereinafter, embodiments of a method for providing a response to a query to a user device will be described with reference to FIGS. 4 to 6.

Figure 4:
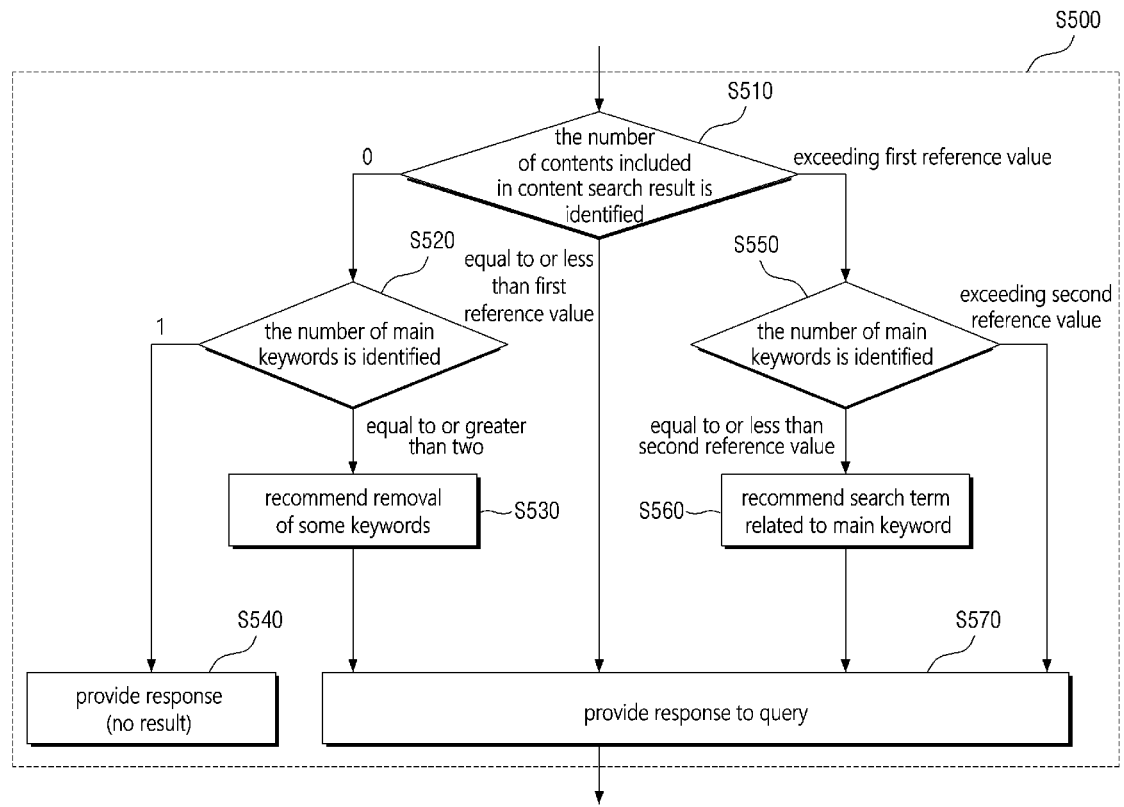
FIG. 4 is a detailed flowchart illustrating embodiments of a method for providing a response to a user device described with reference to FIG. 2.

Referring to FIG. 4, in step S510, the number of contents included in the content search result is identified.

According to an embodiment, when there is no content search result, the number of main keywords used in content search is identified (S520). When the number of the main keywords is one, no result response may be provided to the user device 10 (S540).

According to the above-described embodiments, when there is no content search result of a chatbot group and the number of main keywords used in content search is one, search results cannot be increased any more by removing search keywords. Therefore, a search result can be efficiently provided by immediately transmitting a response message indicating no result to the user.

Again in step S520, if there are two or more main keywords in the chatbot group, it may be recommended to remove some of the main keywords (S530). At this time, a keyword removal recommendation list may be provided to the user device 10. Here, the content re-search is requested to the chatbot group 30 based on the remaining main keywords after removing the keywords one by one in order of lower weight among the extracted main keywords, and when one or more contents are searched as a result of the content re-search, the keyword removal recommendation list may be a recommendation list recommending a search for the remaining main keywords after removing the corresponding keyword.

Hereinafter, a method for recommending removal of some keywords will be described in detail with reference to FIG. 5.

Figure 5:
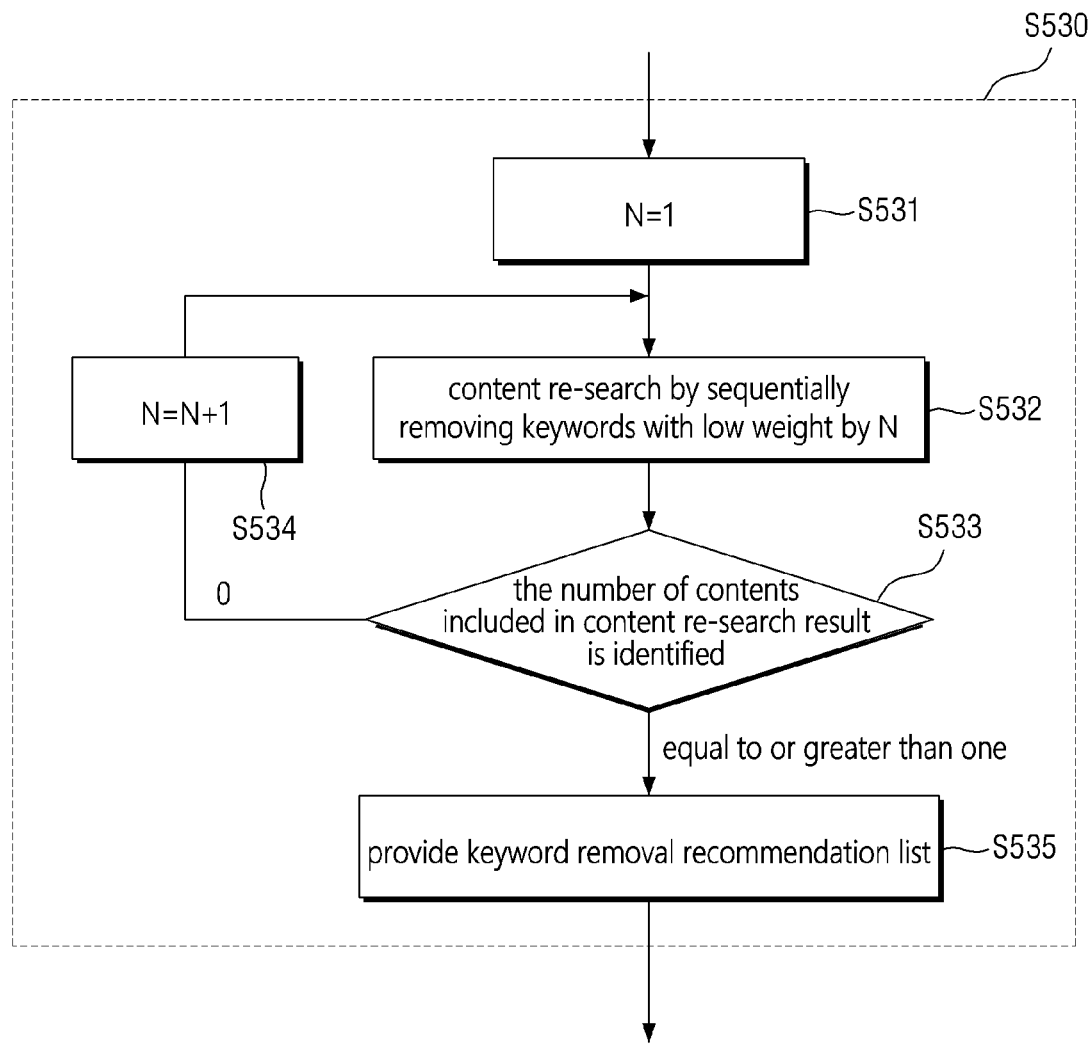
FIG. 5 is a detailed flowchart for describing a method for recommending removal of some keywords described with reference to FIG. 4.
Figure 6:
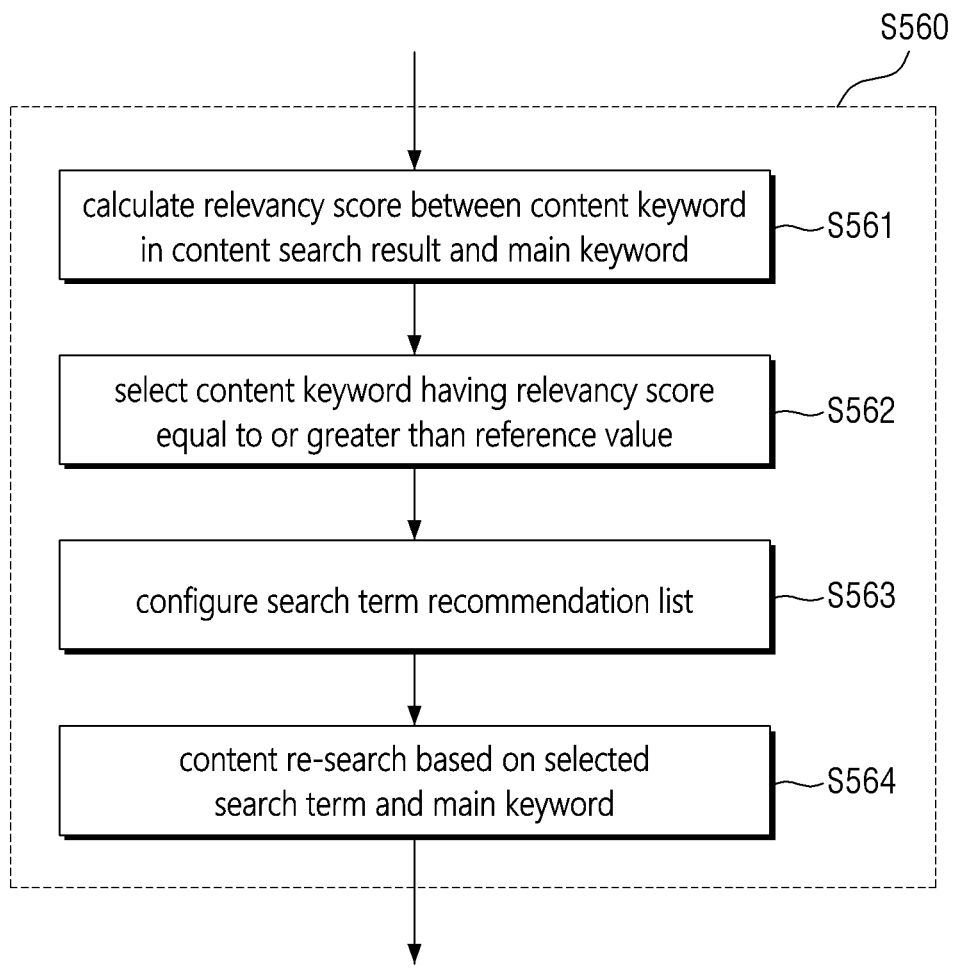
FIG. 6 is a detailed flowchart illustrating a method of recommending a search term related to the main keyword described with reference to FIG. 4.

Referring to FIG. 5, the number of keywords (N) to be removed is determined to be one (S531). Among the extracted main keywords, keywords are removed one by one in order of lower weight, and based on the remaining main keywords, the content re-search is requested to the chatbot group 30 (S532).

According to an embodiment, the weight may be a value derived using a term frequency-inverse document frequency (TF-IDF) algorithm. Here, the Document may correspond to the content of the present disclosure.

According to an embodiment, when it is identified that the number of contents included in the content re-search result is at least one (S533), a keyword removal recommendation list, in which main keywords except for the removed keyword corresponding to the content included in the content re-search result is recommended, may be provided to the user (S535).

However, as a result of re-searching the content by removing a keyword one by one in order of lower weight, if the content is still not searched (S533), the value of the number of keywords to be removed is increased by one (S534), and returns to step S532, and a process of requesting content re-search from the chatbot group 30 based on the remaining main keywords after removing keywords two by two in order of lower weight may be repeated. This process continues until the number of contents included in the content re-search result becomes one or more. A specific example of the embodiment will be described later with reference to FIG. 7.

According to an embodiment, as a result of content re-search by sequentially removing a keyword with the number of keywords to be removed of N, when the number of contents included in the re-search result is 0, the value of the number of keywords to be removed is increased from N to N+I, and steps S532 and S533 are repeated again.

According to the above-described method, when there is no content search result, the re-search is repeated by removing a keyword one by one in order of lower weight among the main keywords. Therefore, the effect of efficiently providing content that meets the user's intention even if there is no initial content search result can be achieved.

Referring now to FIG. 7, a method of extracting keywords and calculating weights of keywords based on an exemplary query by a user according to some embodiments of the present disclosure will be described.

Referring to FIG. 7, an exemplary content table 40 is shown. Here, the title 41 is text that is a keyword extraction target from content.

According to an embodiment, hashtags 42 are matched for each title 41, and content keywords may be extracted based on words included in the title and words included in the corresponding hashtag. The keyword (redundancy removal) 43 includes a result of extracting keywords by removing duplicates from each title 41 and hashtag 42. Here, the keywords included in the keyword (redundancy removal) 43 may be content keywords of the present disclosure. Here, as the keyword extraction method, various known keyword extraction algorithms may be utilized, and the keywords shown in the content table 40 are only one example using a specific keyword extraction method.

Referring to the TF-DF table 50, TF and DF values are shown for each keyword 51. Here, each numerical value is an exemplary numerical value.

According to one embodiment, the target text of the TF operation may include a content title and may further include a hashtag.

According to one embodiment, the target text of the DF operation may include a content title and may further include a hashtag. Here, the Document corresponds to the content of the present disclosure, and in this case, the content of the present disclosure may include a content title and a hashtag corresponding to the content title.

Hereinafter, the TF-IDF calculation method of the keyword will be described based on the exemplary TF-DF table 50 corresponding to the case where the integrated chatbot 20 receives an exemplary query of "Is it possible to apply for a language test even during leave of absence?" from the user device 10.

First, keywords such as "leave of absence, language, test, apply, possible" can be extracted from the above query. Here, as the keyword extraction method, various known algorithms may be used.

The TF-IDF value may be calculated with reference to the table 50 including predetermined TF and DF values for each of the keywords. Here, various known calculation methods may be used for calculating TF and DF.

As a result, the TF-IDF values of 1.081 for the 'leave of absence' keyword, 1.067 for the 'language' keyword, 1.053 for the 'test' keyword, 1.038 for the 'apply' keyword, and 1.026 for the 'possible' keyword can be derived.

In this case, when the number of keywords to be removed is one (S531), a keyword removal recommendation list, in which the extracted keywords are listed in order of lower weight, possible, apply, test, language, and leave of absence, may be generated and provided to the user device 10.

According to one embodiment, after removing the corresponding keywords in order of lower weight, that is, in the order of possible, apply, exam, language, and leave of absence, the content re-search is requested to the chatbot group 30 based on the remaining main keywords (S532). As a result of the re-search, if even one content is searched, a keyword removal recommendation list recommending a search with the corresponding main keywords may be provided (S535).

For example, if keywords are removed for each of 'possible' and 'apply' keywords and there is a content re-search result for the remaining main keywords, first, "leave of absence language test apply" keyword search may be recommended, and secondly, a keyword removal recommendation list that recommends "leave of absence language test possible" keyword search may be provided.

According to an embodiment, when content re-search is performed by excluding each of the keywords of 'possible,' 'apply,' 'test,' 'language,' and 'leave of absence,' if each re-search result does not exist at all, the number of keywords to be removed is increased by one (S534), and the process of re-searching the content by removing two keywords with low weight is repeated (S532), and a keyword removal recommendation list recommending keyword search for a case where there is a re-search result may be provided (S535).

For example, if there are search results only when 'possible apply' is removed, a keyword removal recommendation list recommending keyword search for 'leave of absence language test' may be provided.

Referring back to FIG. 4, when a request to remove a specific keyword is received from the user device 10 according to the recommendation to remove some keywords (S530), a response to the query may be provided to the user device 10 based on the result of removing the specific keyword and performing a content search using the remaining main keywords (S570). A method of sorting a response to the query will be described later based on FIGS. 8 and 9.

Returning to step S510 again, when the number of contents included in the content search result is equal to or less than the first reference value, a response to the query may be provided to the user device 10 based on the content search result (S570). Here, the first reference value may be a value in consideration of the number of contents that can be displayed on one screen of the user device 10. Alternatively, the first reference value may be a value in consideration of the number of contents, for which the user can easily utilize the content search result.

According to the foregoing, when content search results equal to or less than the first reference value is derived, an effect that the user can easily identify the entire content search results on the screen, and the user can find a desired answer through an appropriate number of content search results is provided.

Returning to step S510 again, when the number of contents included in the content search result exceeds the first reference value, the number of main keywords used in the content search is identified (S550).

In step S550, when the number of main keywords exceeds the second reference value, a response to the query may be provided to the user based on the content search result.

Here, the second reference value may be a value determined by comparing and weighing the effect of the user's inconvenience of having to check a large number of content search results and the effect of obtaining search results that meet the user's purpose by searching only with keywords included in the user's query.

In step S550, when the number of main keywords is equal to or less than the second reference value, a search term related to the main keyword may be recommended (S560).

Hereinafter, referring to FIG. 6, a method for recommending a related search term will be described in detail.

In step S561, relevancy scores between content keywords included in the content search result and main keywords are calculated.

Here, the relevancy score may be calculated based on the co-occurrence frequency of content keywords appearing in content included in the content search result and the main keyword.

According to one embodiment, the relevancy score may be a value obtained by generating a Co-Occurrence Matrix with main keywords and content keywords and dividing the frequency value corresponding to the main keyword and the content keyword of a Co-Occurrence matrix by the TF value of the content keyword.

That is, it may be that the relevancy score=CO(A,B)/TF (B).

Here, it may be that A=main keyword, B=content keyword, and CO(A,B)=frequency value for (A,B).

In step S562, a content keyword having the relevancy score equal to or greater than a reference value may be selected.

In step S563, a search term recommendation list may be configured based on the selected content keyword. In this case, the search term recommendation list may be configured by arranging content keywords selected in order of higher relevancy score.

In step S564, when one content keyword is selected by the user, content re-search may be performed based on the selected content keyword (or selected search term) and the main keyword. Thereafter, a response to the query may be provided to the user based on the content re-search result.

Referring again to FIG. 4, the step of providing a response to the user (S570) will be described in detail. Here, when a response is provided to the user based on a content search result, the content search result may be arranged according to a predetermined priority and provided to the user.

Hereinafter, a content search result sorting method according to some embodiments of the present disclosure will be described with reference to FIGS. 8 and 9.

Referring to FIG. 8, a content search result table 60 sorted according to user logs is provided. In the case of the sorted content search result table 60, the searched content is listed in order of the higher user search frequency.

Referring to FIG. 9, the sorted user response 70 may refer to screen display contents that provides a search result to the user based on content listed in order of the higher user search frequency. That is, according to an embodiment, a method of sorting content search results may be a method of assigning priority to content in order of higher user search frequency and arranging them.

According to an embodiment, a method of sorting content search results may be a method of assigning priority to content in consideration of relevancy with a currently ongoing event.

For example, when the 'staff' query is input to the user device 10, search results may be provided to the user by prioritizing content related to year-end tax settlement staff and health insurance premium settlement staff related to the 'staff.'

According to an embodiment, a method of assigning a priority according to a currently ongoing event and a method of assigning a priority according to the user search frequency may be mixed and applied. For example, after priorities are assigned according to events, content search results may be sorted by assigning priorities according to the user search frequency for events of the same category.

According to the above-described embodiments, by sorting content search results according to priority and providing them to the user, the user may be provided with search results that more closely match the user's intention.

Figure 10:
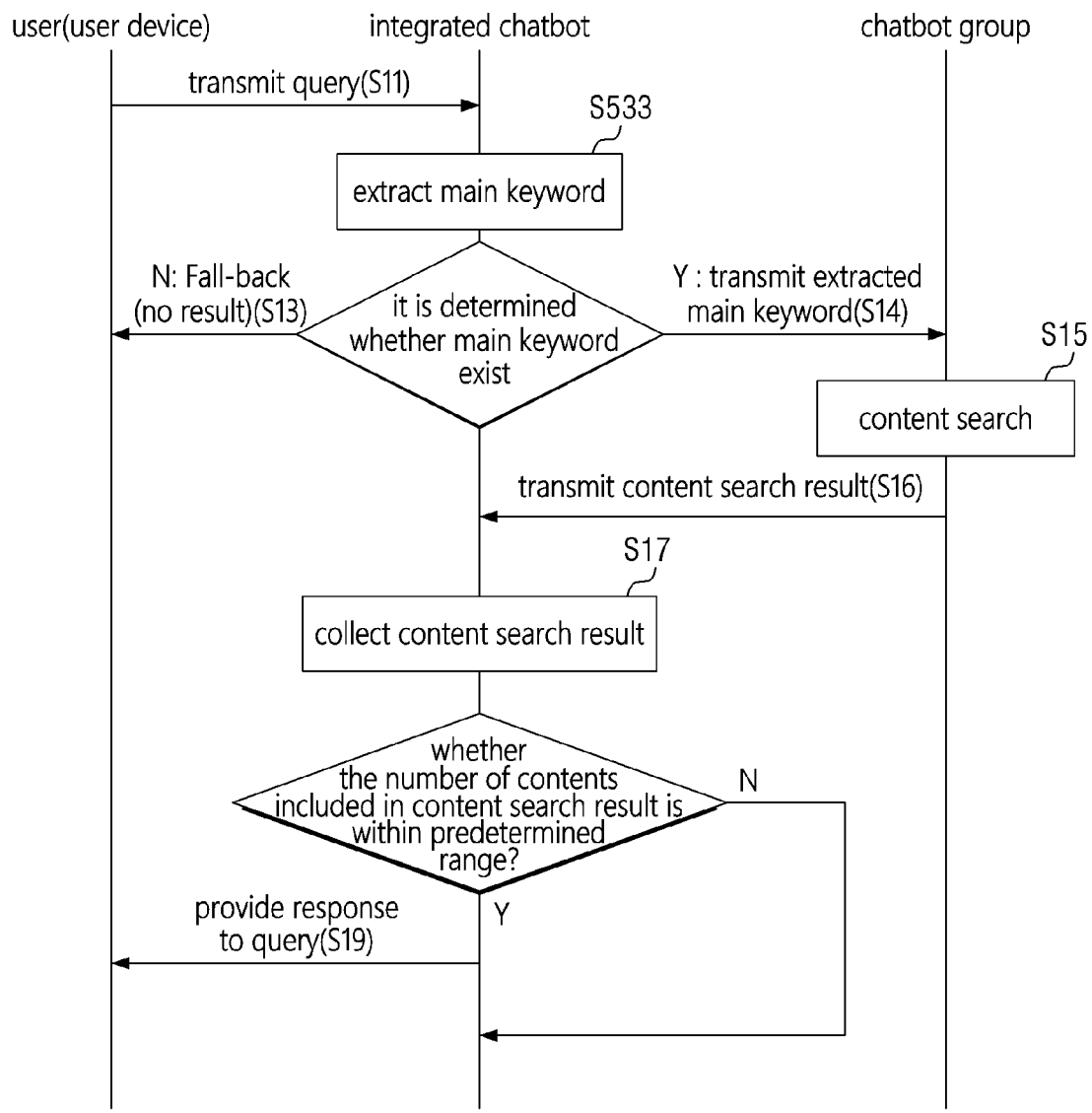
FIG. 10 is a flowchart illustrating a method for providing an integrated chatbot service according to another embodiment of the present disclosure.

FIG. 10 is a flowchart illustrating a method of providing an integrated chatbot service according to an embodiment of the present disclosure.

Referring to FIG. 10, the integrated chatbot 20 may receive a query from the user device 10 (or the user) (S11). At this time, after the main keyword of the received query is extracted (S12), it is determined whether the main keyword exists, and if the main keyword does not exist, a fall-back message may be transmitted to the user device 10 (S13).

If the main keyword exists, a message including the extracted main keyword and a content search request may be transmitted to the chatbot group 30 (S14). The chatbot group 30 may search for content using the main keyword (S15) and transmit the content search result as a response to the transmission message of the integrated chatbot 20 (S16). Here, the message from the integrated chatbot 20 to the chatbot group 30 may be performed in the asynchronous manner described above.

After the content search results of the entire chatbot group 30 are collected (S17), the content search result processing method may vary depending on whether the content exists in the content search results, is within a predetermined range, or exceeds a predetermined range.

First, when the number of contents included in the content search result is within a predetermined range, a response to the query may be provided to the user device 10 based on the content search result (S19).

When the number of contents included in the content search result is outside a predetermined range, a processing method may vary depending on whether or not content included in the content search result exists.

Hereinafter, a method for providing an integrated chatbot service when a content search result exists in FIG. 11 will be described in detail.

Figure 11:
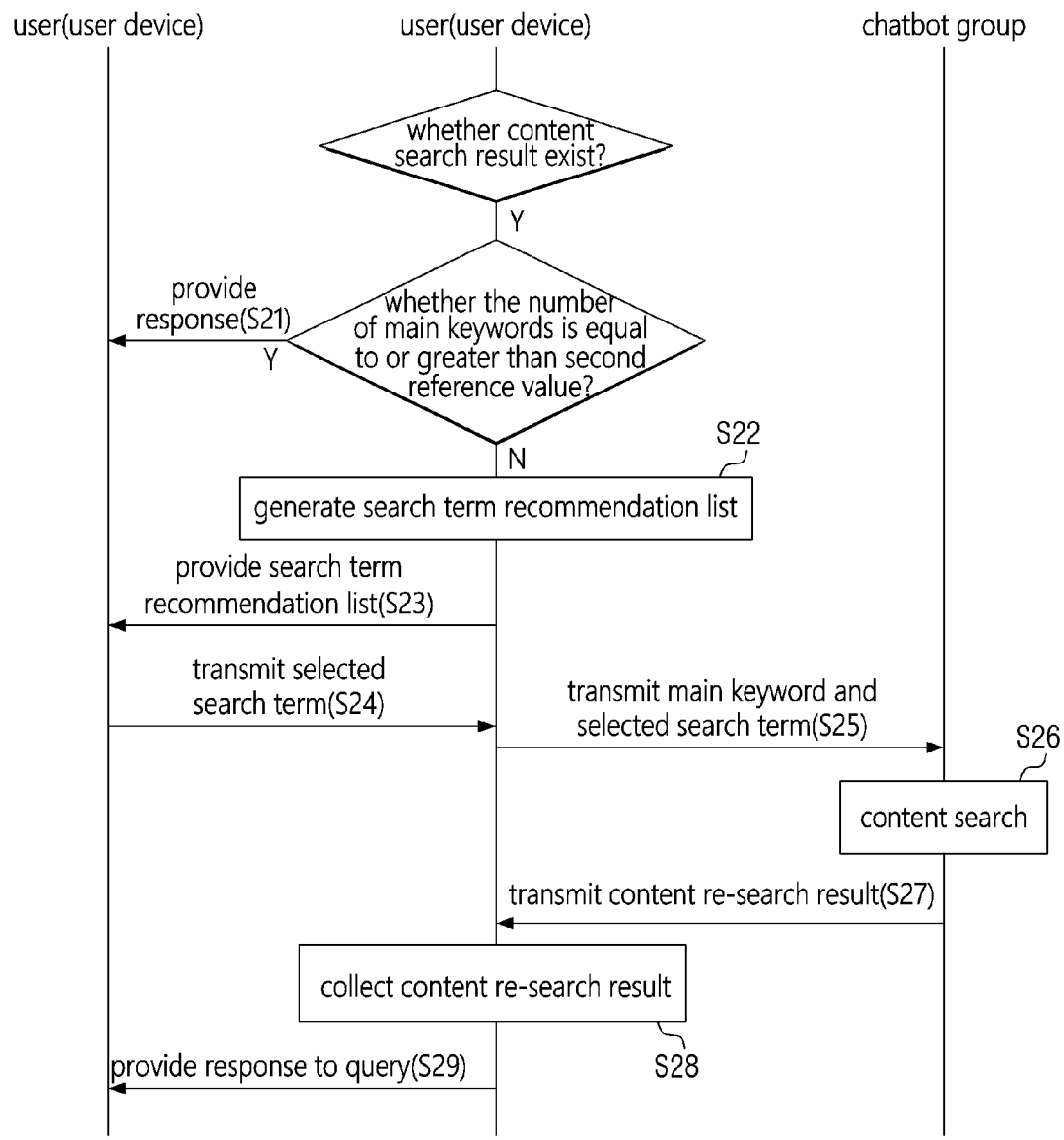
FIGS. 11 and 12 are detailed flow charts for describing embodiments when the number of contents included in the content search result described is outside a predetermined range with reference to FIG. 10.

Referring to FIG. 11, when a content search result exists and the number of main keywords used in the content search is equal to or greater than the second reference value, a response to the query may be provided to the user device 10 based on the content search result (S21).

However, when the number of main keywords is less than the second reference value, a search term recommendation list may be generated (S22). The configuration and generation method of the search term recommendation list have been described above.

Thereafter, the integrated chatbot 20 may provide a search term recommendation list to the user device 10 (S23). The user can select any one of the recommended search terms, and when the search term is selected, the search term selected from the user device 10 is transmitted to the integrated chatbot 20 (S24), and the selected search term and main keywords are transmitted back to the chatbot group 30 (S25) and content re-search can be performed by the chatbot group 30 (S26).

After the content re-search results are transmitted to the integrated chatbot 20 (S27), the content re-search results are collected (S28), and a response to the query may be provided to the user device 10 based on the re-search results (S29).

Hereinafter, a method for providing an integrated chatbot service when there is no content search result in FIG. 12 will be described in detail.

Figure 12:
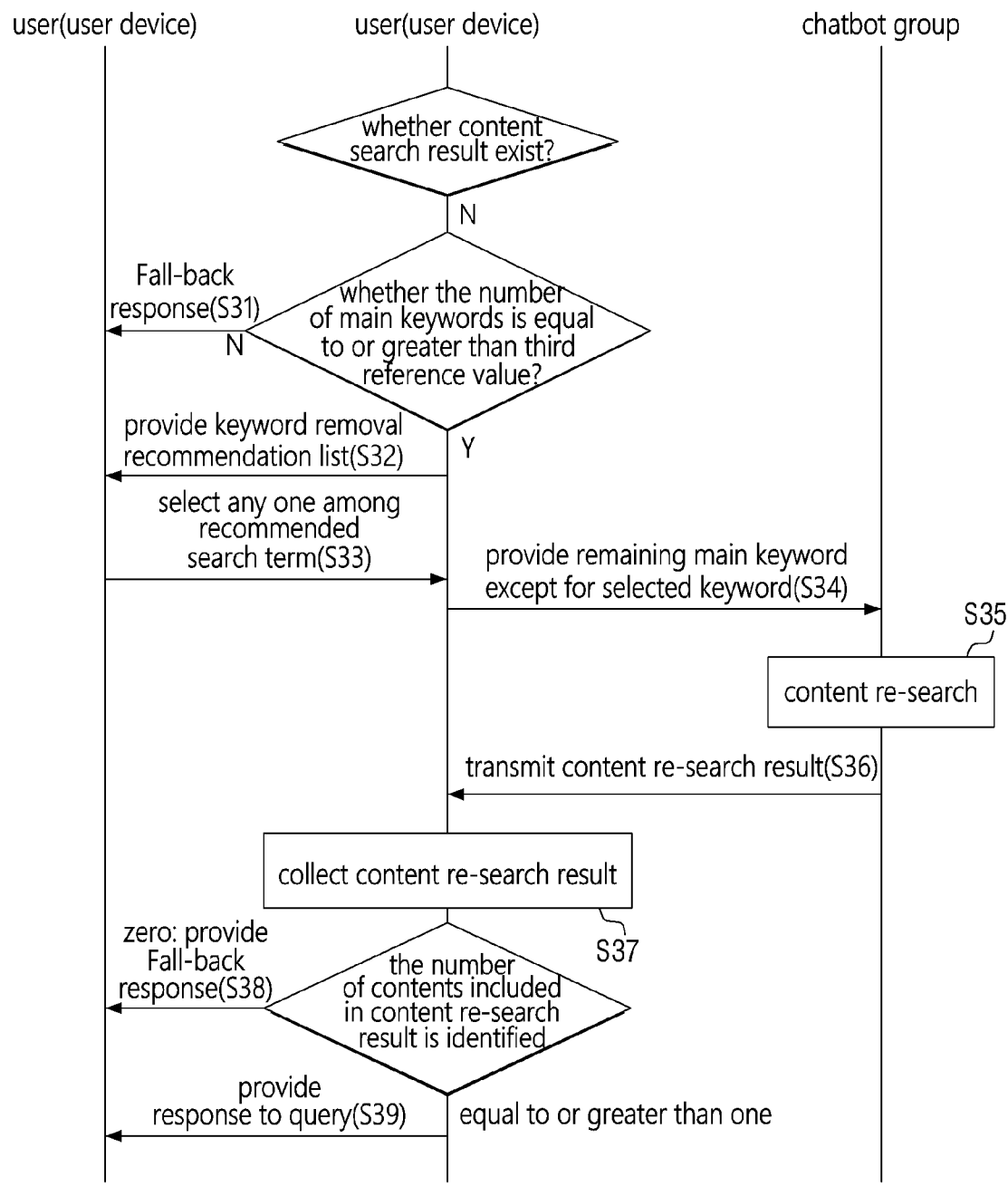

Referring to FIG. 12, when there is no content search result, it is determined whether the number of main keywords is equal to or greater than a third reference value.

When the number of main keywords is less than the third reference value, a fall-back message response may be transmitted to the user device 10 (S31).

When the number of main keywords is equal to or greater than the third reference value, a keyword removal recommendation list may be provided to the user device 10 (S32). The method of configuring and generating the keyword removal recommendation list has been described above.

The user may select one of the recommended keywords, and the selected keyword may be transmitted from the user device 10 (S33). Thereafter, the main keywords other than the selected keyword may be transmitted to the chatbot group 30 (S34), and at this time, a content re-search request may be included in the transmission message.

According to the content re-search request, the chatbot group 30 may perform content re-search using the main keywords other than the selected keyword (S35). Thereafter, a content re-search result is received from the chatbot group 30 (S36), and the received content re-search result may be collected (S37).

If content does not exist in the content re-search result, a fall-back message may be transmitted to the user device 10 (S38), and if content is included in the content re-search result, a response to the inquiry may be provided to the user device 10 based on the content re-search result (S39).

According to the above-described embodiments, when too many content search results are searched, it is possible to recommend additional keywords that can obtain results more accurately and efficiently to the user, and when there are no or insufficient content search results, the content search is performed again by removing some of the main keywords used in the content search, and therefore an effect of obtaining a result meeting the user's needs is provided.

Figure 13:
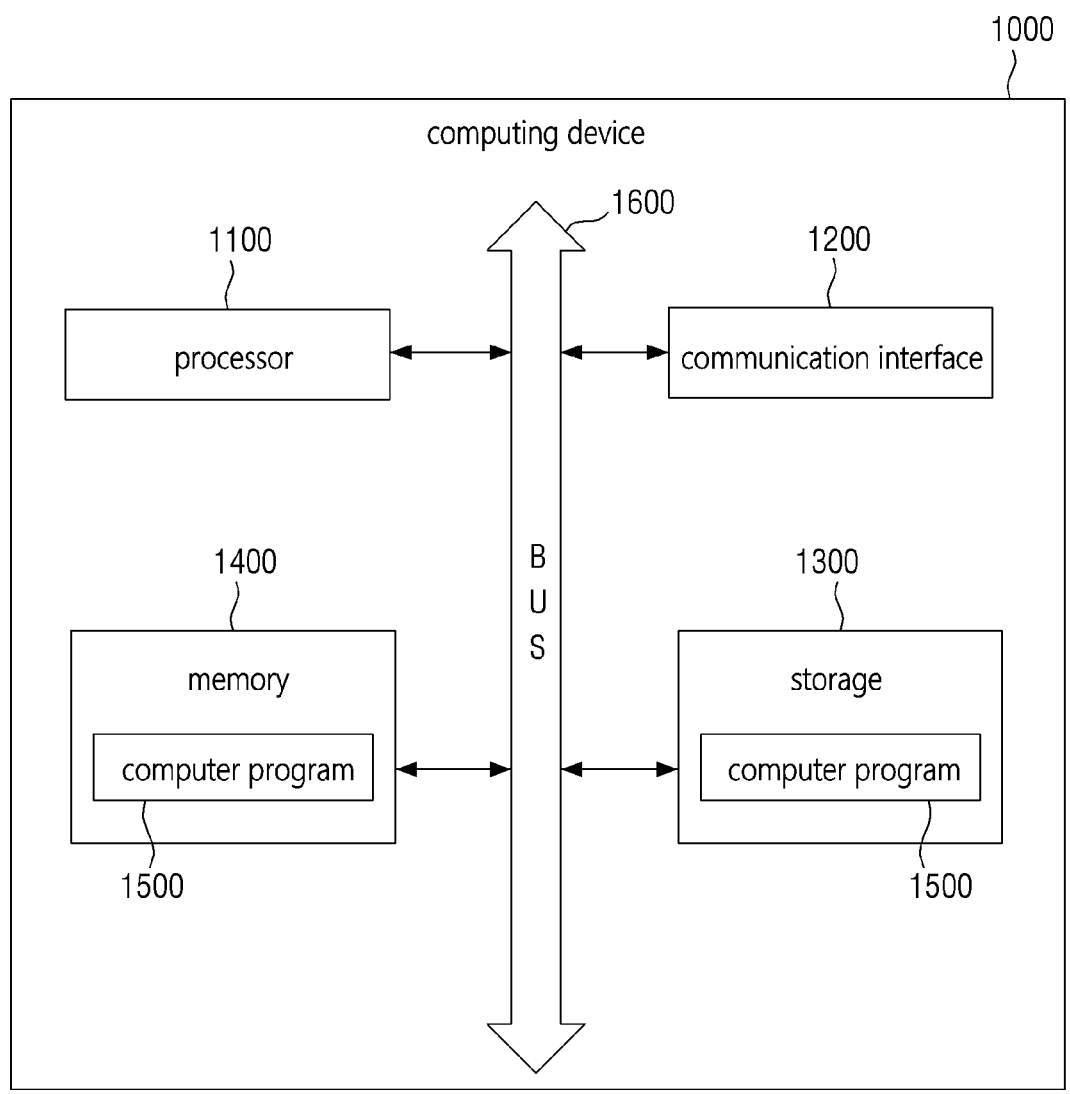
FIG. 13 is a block diagram illustrating a hardware configuration of an exemplary computing device, in which various embodiments of the present disclosure are implemented.

FIG. 13 is a hardware configuration diagram of an exemplary computing device capable of implementing the integrated chatbot service providing system 100 according to some embodiments of the present disclosure. As shown in FIG. 13, the computing device 1000 may comprise one or more processors 1100, a system bus 1600, a communication interface 1200, a memory 1400 for loading a computer program 1500 executed by the processor 1100, and a storage 1300 for storing the computer program 1500.

The processor 1100 controls the overall operation of each component of the computing device 1000. The processor 1100 may perform an operation for at least one application or program for executing a method/operation according to various embodiments of the present disclosure.

The memory 1400 stores various data, commands and/or information. The memory 1400 may load one or more computer programs 1500 from storage 1300 to execute methods/operations according to various embodiments of the present disclosure.

The storage 1300 may non-temporarily store one or more computer programs 1500.

The computer program 1500 may include one or more instructions, in which methods/operations according to various embodiments of the present disclosure are implemented. When the computer program 1500 is loaded into the memory 1400, the processor 1100 may execute the one or more instructions to perform methods/operations according to various embodiments of the present disclosure.

The computer program 1500 may include one or more instructions to perform, for example, an operation of receiving a query from a user device, an operation of extracting a main keyword from the query, an operation of transmitting the extracted keyword to a first chatbot and a second chatbot, an operation of receiving a content search result for the extracted main keyword from the first chatbot and the second chatbot and an operation of providing a response to the user device based on the received content search result. In this case, the integrated chatbot service providing system according to an embodiment of the present disclosure may be implemented through the computing device 1000.

So far, a variety of embodiments of the present disclosure and the effects according to embodiments thereof have been mentioned with reference to FIGS. 1 to 13. The effects according to the technical idea of the present disclosure are not limited to the forementioned effects, and other unmentioned effects may be clearly understood by those skilled in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the example embodiments without substantially departing from the principles of the present disclosure. Therefore, the disclosed example embodiments of the disclosure are used in a generic and descriptive sense only and not for purposes of limitation.

What is claimed is:

1. A method performed by a computing system for providing an integrated chatbot-based service, the method comprising:
   receiving, by an integrated chatbot, a query from a user device;
   extracting a keyword from the query;
   extracting a main keyword by removing, from among the extracted keyword, a keyword that does not match a content keyword previously extracted and stored from content respectively associated with a first chatbot and a second chatbot;
   transmitting the extracted main keyword to the first chatbot and the second chatbot;
   receiving a content search result corresponding to the extracted main keyword from the first chatbot and the second chatbot; and
   providing a response to the query to the user device based on the received content search result.

2. The method of claim 1, wherein the content keyword is extracted from content of the first chatbot and the second chatbot based on an occurrence frequency of a keyword.

3. The method of claim 1, further comprising:
   providing a fall-back message to the user device immediately in response to determining that the main keyword does not exist as a result of the removing of the keyword.

4. The method of claim 1, wherein the providing the response comprises:
   providing the content search result to the user device when a number of contents included in the content search result is within a predetermined range.

5. The method of claim 1, wherein the providing the response comprises:

recommending a search term related to the main keyword when a number of contents included in the content search result exceeds a reference value.

6. The method of claim 5, wherein the recommending the search term comprises:
calculating a relevancy score based on a co-occurrence frequency of each content keyword of content keywords appearing in content included in the content search result and the main keyword; and
selecting a content keyword whose relevancy score is equal to or greater than a reference value from among the content keywords; and
configuring a search term recommendation list based on the selected content keyword.

7. The method of claim 6, wherein the configuring the search term recommendation list comprises:
configuring the search term recommendation list by arranging the selected content keyword in order of a higher relevancy score.

8. The method of claim 6, wherein the relevancy score is calculated based on the co-occurrence frequency and an occurrence frequency of a content keyword.

9. The method of claim 1, wherein the providing the response comprises:
recommending, when content does not exist in the content search result and a number of the extracted main keyword is plural, removal of some of the extracted main keywords.

10. The method of claim 9, wherein the recommending the removal of some of the extracted main keywords comprises,
providing a removal recommendation list of some keywords by removing one keyword from among the extracted main keywords in order of lower weight and recommending content re-search using remaining main keywords except for the one removed keyword.

11. The method of claim 10, wherein the providing the removal recommendation list further comprises:
providing, if content is not searched as a result of the content re-search, a removal recommendation list of some keywords by removing two keywords from among the extracted main keywords in order of lower weight and recommending content re-search using remaining main keywords except for the two removed keywords.

12. The method of claim 10, wherein the weight is a value derived using a TF-IDF (Term Frequency-Inverse Document Frequency) algorithm,
wherein the Document corresponds to content.

13. The method of claim 1, wherein providing the response comprises,
sorting the content search result according to a predetermined priority to provide it to the user device.

14. The method of claim 13, wherein the predetermined priority is based on at least one of a relevancy with a currently ongoing event and a number of views of the searched content.

15. A system for providing an integrated chatbot-based service comprising:
a memory configured to store one or more instructions; and
one or more processors configured to execute the stored one or more instructions to perform:
receiving a query from a user device;
extracting a keyword from the query;
extracting a main keyword by removing, from among the extracted keyword, a keyword that does not match a content keyword previously extracted and stored from content respectively associated with a first chatbot and a second chatbot;
transmitting the extracted main keyword to the first chatbot and the second chatbot;
receiving, from the first chatbot and the second chatbot, a content search result corresponding to the extracted main keyword; and
providing a response to the user device based on the received content search result.

16. A non-transitory computer readable recording medium storing computer program executable by at least one processor to perform:
receiving, by an integrated chatbot, a query from a user device;
extracting a keyword from the query;
extracting a main keyword by removing, from among the extracted keyword, a keyword that does not match a content keyword previously extracted and stored from content respectively associated with a first chatbot and a second chatbot;
transmitting the extracted main keyword to the first chatbot and the second chatbot;
receiving, from the first chatbot and the second chatbot, a content search result corresponding to the extracted main keyword; and
providing a response to the query to the user device based on the received content search result.

* * * * *